(12) United States Patent
Levine et al.

(10) Patent No.: US 12,555,478 B2
(45) Date of Patent: Feb. 17, 2026

(54) SYSTEM AND METHOD FOR REALTIME COMMUNITY INFORMATION EXCHANGE

(71) Applicant: Google LLC, Mountain View, CA (US)

(72) Inventors: Uri Levine, Kfar Saba (IL); Amir Shinar, Moshav Herut (IL); Ehud Shabtai, Tel-Aviv (IL)

(73) Assignee: Google LLC, Mountain View, CA (US)

( * ) Notice: Subject to any disclaimer, the term of this patent is extended or adjusted under 35 U.S.C. 154(b) by 1022 days.

(21) Appl. No.: 15/948,248

(22) Filed: Apr. 9, 2018

(65) Prior Publication Data

US 2018/0225966 A1   Aug. 9, 2018

Related U.S. Application Data

(63) Continuation of application No. 14/995,660, filed on Jan. 14, 2016, now Pat. No. 9,972,208, which is a
(Continued)

(51) Int. Cl.
| | | |
|---|---|---|
| *G08G 1/0968* | (2006.01) | |
| *G01C 21/34* | (2006.01) | |
| *G08G 1/01* | (2006.01) | |

(52) U.S. Cl.
CPC ....... *G08G 1/096805* (2013.01); *G01C 21/34* (2013.01); *G01C 21/3415* (2013.01); *G01C 21/3438* (2013.01); *G01C 21/3492* (2013.01); *G08G 1/01* (2013.01); *G08G 1/0104* (2013.01); *G08G 1/0112* (2013.01);
(Continued)

(58) Field of Classification Search
CPC ........... G08G 1/096805; G08G 1/0133; G08G 1/0141; G08G 1/0112; G08G 1/0125; G08G 1/01; G08G 1/096811; G08G 1/096844; G08G 1/0104; G01C 21/3415; G01C 21/34; G01C 21/3438; G01C 21/3492;
(Continued)

(56) References Cited

U.S. PATENT DOCUMENTS

| | | |
|---|---|---|
| 5,428,544 A | 6/1995 | Shyu |
| 5,845,228 A | 12/1998 | Jekawa et al. |

(Continued)

FOREIGN PATENT DOCUMENTS

| | | |
|---|---|---|
| EP | 1742191 A2 | 1/2007 |
| JP | 2000298793 A | 10/2000 |
| JP | 2003281684 A | 10/2003 |

OTHER PUBLICATIONS

Office Action mailed Jan. 25, 2013, U.S. Appl. No. 12/199,187, filed Aug. 27, 2008, Uri Levine et al.
(Continued)

*Primary Examiner* — Jeffrey A Shapiro
(74) *Attorney, Agent, or Firm* — Lerner David LLP

(57) ABSTRACT

System and method for traffic mapping service are disclosed for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay.

19 Claims, 4 Drawing Sheets

Related U.S. Application Data continuation of application No. 14/279,766, filed on May 16, 2014, now Pat. No. 9,275,544, which is a continuation of application No. 12/122,810, filed on May 19, 2008, now Pat. No. 8,762,035.

(52) U.S. Cl.
CPC ......... *G08G 1/0125* (2013.01); *G08G 1/0133* (2013.01); *G08G 1/0141* (2013.01); *G08G 1/096811* (2013.01); *G08G 1/096844* (2013.01)

(58) Field of Classification Search
CPC .... G01M 17/00; G01S 5/0072; B61L 25/025; B61L 2505/04
USPC ....... 340/988, 995.12, 995.13; 342/454–458; 701/29.3, 117–122, 422, 423, 482
See application file for complete search history.

(56) References Cited

U.S. PATENT DOCUMENTS

| | | | |
|---|---|---|---|
| 6,047,234 A | 4/2000 | Cherveny et al. | |
| 6,111,539 A | 8/2000 | Mannings et al. | |
| 6,150,961 A | 11/2000 | Alewine et al. | |
| 6,202,024 B1* | 3/2001 | Yokoyama | G01C 21/26 701/24 |
| 6,208,935 B1 | 3/2001 | Yamada et al. | |
| 6,385,539 B1 | 5/2002 | Wilson et al. | |
| 6,405,130 B1 | 6/2002 | Piwowarski | |
| 6,459,986 B1 | 10/2002 | Boyce et al. | |
| 6,459,988 B1 | 10/2002 | Fan et al. | |
| 6,473,693 B1 | 10/2002 | Kusama | |
| 6,480,783 B1* | 11/2002 | Myr | G01C 21/3492 340/990 |
| 6,490,519 B1* | 12/2002 | Lapidot | G01C 21/34 340/905 |
| 6,529,159 B1 | 3/2003 | Fan et al. | |
| 6,552,682 B1 | 4/2003 | Fan | |
| 6,594,576 B2 | 7/2003 | Fan et al. | |
| 6,664,922 B1 | 12/2003 | Fan | |
| 6,795,017 B1 | 9/2004 | Puranik et al. | |
| 6,804,524 B1* | 10/2004 | Vandermeijden | G01C 21/26 340/988 |
| 6,816,782 B1* | 11/2004 | Walters | G01C 21/20 701/426 |
| 6,832,140 B2 | 12/2004 | Fan et al. | |
| 6,862,502 B2 | 3/2005 | Peltz et al. | |
| 6,862,524 B1 | 3/2005 | Nagda et al. | |
| 6,867,733 B2 | 3/2005 | Sandhu et al. | |
| 6,882,313 B1 | 4/2005 | Fan et al. | |
| 6,922,566 B2 | 7/2005 | Puranik et al. | |
| 6,973,384 B2 | 12/2005 | Zhao et al. | |
| 6,992,598 B2 | 1/2006 | Poltorak | |
| 7,006,820 B1 | 2/2006 | Parker et al. | |
| 7,035,620 B2 | 4/2006 | Ben-Efraim et al. | |
| 7,043,255 B1 | 5/2006 | Tiwari | |
| 7,080,019 B1 | 7/2006 | Hurzeler | |
| 7,203,721 B1 | 4/2007 | Ben-Efraim et al. | |
| 7,219,123 B1 | 5/2007 | Fiechter et al. | |
| 7,253,747 B2 | 8/2007 | Noguchi | |
| 7,269,505 B2 | 9/2007 | Zhao et al. | |
| 7,286,857 B1 | 10/2007 | Walker et al. | |
| 7,301,925 B2 | 11/2007 | Fan et al. | |
| 7,319,931 B2 | 1/2008 | Uyeki et al. | |
| 7,359,713 B1 | 4/2008 | Tiwari | |
| 7,430,472 B2 | 9/2008 | Zhao et al. | |
| 7,440,842 B1 | 10/2008 | Vorona | |
| 7,451,042 B2 | 11/2008 | Uyeki et al. | |
| 7,469,827 B2 | 12/2008 | Katragadda et al. | |
| 7,474,232 B2 | 1/2009 | Chen et al. | |
| 7,516,010 B1 | 4/2009 | Kaplan et al. | |
| 7,538,690 B1 | 5/2009 | Kaplan et al. | |
| 7,613,563 B2* | 11/2009 | Haegebarth | G08G 1/20 701/117 |
| 7,613,564 B2 | 11/2009 | Vorona | |
| 7,642,928 B2 | 1/2010 | Hutchison | |
| 7,671,764 B2 | 3/2010 | Uyeki et al. | |
| 7,680,594 B2 | 3/2010 | Cabral et al. | |
| 7,680,596 B2 | 3/2010 | Uyeki et al. | |
| 7,779,444 B2 | 8/2010 | Glad | |
| 7,805,239 B2 | 9/2010 | Kaplan et al. | |
| 7,912,628 B2 | 3/2011 | Chapman et al. | |
| 7,966,215 B1* | 6/2011 | Myers | G08G 1/096838 705/13 |
| 8,121,780 B2 | 2/2012 | Gerdes et al. | |
| 8,271,057 B2 | 9/2012 | Levine et al. | |
| 8,762,035 B2 | 6/2014 | Levine et al. | |
| 9,275,544 B2* | 3/2016 | Levine | G08G 1/096805 |
| 9,972,208 B2* | 5/2018 | Levine | G08G 1/0141 |
| 2002/0082771 A1 | 6/2002 | Anderson | |
| 2002/0108125 A1 | 8/2002 | Joao | |
| 2003/0014187 A1 | 1/2003 | Chun et al. | |
| 2003/0040944 A1 | 2/2003 | Hileman | |
| 2003/0054810 A1 | 3/2003 | Chen et al. | |
| 2003/0100993 A1 | 5/2003 | Kirshenbaum et al. | |
| 2003/0154480 A1 | 8/2003 | Goldthwaite et al. | |
| 2004/0049424 A1 | 3/2004 | Murray et al. | |
| 2004/0059503 A1 | 3/2004 | Peters | |
| 2004/0068364 A1 | 4/2004 | Zhao et al. | |
| 2004/0104842 A1 | 6/2004 | Drury et al. | |
| 2004/0107048 A1 | 6/2004 | Yokota | |
| 2004/0119612 A1* | 6/2004 | Chen | G08G 1/0104 340/995.13 |
| 2004/0158392 A1 | 8/2004 | Choi | |
| 2004/0172192 A1 | 9/2004 | Knutson | |
| 2004/0249568 A1 | 12/2004 | Endo et al. | |
| 2005/0027436 A1 | 2/2005 | Yoshikawa et al. | |
| 2005/0033511 A1 | 2/2005 | Pechatnikov et al. | |
| 2005/0049771 A1 | 3/2005 | Kuang et al. | |
| 2005/0071080 A1 | 3/2005 | Sano | |
| 2005/0083211 A1 | 4/2005 | Shafir et al. | |
| 2005/0113124 A1 | 5/2005 | Syrjarinne et al. | |
| 2005/0131643 A1* | 6/2005 | Shaffer | G08G 1/096844 701/414 |
| 2005/0195783 A1* | 9/2005 | Basir | H04L 67/06 370/338 |
| 2005/0216301 A1 | 9/2005 | Brown | |
| 2005/0222751 A1 | 10/2005 | Uyeki | |
| 2005/0222756 A1* | 10/2005 | Davis | G01C 21/3484 701/466 |
| 2005/0222760 A1 | 10/2005 | Cabral et al. | |
| 2005/0222764 A1 | 10/2005 | Uyeki et al. | |
| 2005/0253753 A1 | 11/2005 | Lalik et al. | |
| 2005/0280555 A1 | 12/2005 | Warner | |
| 2005/0288046 A1 | 12/2005 | Zhao et al. | |
| 2005/0288856 A1 | 12/2005 | Uyeki et al. | |
| 2006/0015249 A1 | 1/2006 | Gieseke | |
| 2006/0025923 A1 | 2/2006 | Dotan et al. | |
| 2006/0155427 A1 | 7/2006 | Yang | |
| 2006/0161341 A1* | 7/2006 | Haegebarth | G08G 1/20 701/117 |
| 2006/0176847 A1 | 8/2006 | Chen et al. | |
| 2006/0253249 A1 | 11/2006 | Bruelle-Drews | |
| 2006/0271290 A1* | 11/2006 | Li | G01C 21/3661 701/469 |
| 2006/0287818 A1 | 12/2006 | Okude et al. | |
| 2007/0010941 A1 | 1/2007 | Marsh | |
| 2007/0024467 A1 | 2/2007 | Fujii | |
| 2007/0069923 A1 | 3/2007 | Mendelson | |
| 2007/0073552 A1 | 3/2007 | Hileman | |
| 2007/0083326 A1* | 4/2007 | Johnson | G08G 1/096811 701/420 |
| 2007/0106465 A1 | 5/2007 | Adam et al. | |
| 2007/0109111 A1 | 5/2007 | Breed et al. | |
| 2007/0118273 A1 | 5/2007 | Tang et al. | |
| 2007/0129885 A1 | 6/2007 | Wellmann | |
| 2007/0138347 A1 | 6/2007 | Ehlers | |
| 2007/0150173 A1* | 6/2007 | Neef | G06F 1/1626 701/425 |
| 2007/0159354 A1 | 7/2007 | Rosenberg | |
| 2007/0198140 A1 | 8/2007 | Mudalige | |

(56) References Cited

U.S. PATENT DOCUMENTS

| | | | |
|---|---|---|---|
| 2007/0208492 A1* | 9/2007 | Downs | G08G 1/0104 701/117 |
| 2007/0213004 A1 | 9/2007 | DaCosta | |
| 2007/0219715 A1 | 9/2007 | Uyeki et al. | |
| 2007/0265770 A1* | 11/2007 | Hirose | G01C 21/00 701/533 |
| 2007/0271029 A1* | 11/2007 | Tzamaloukas | G01C 21/28 701/532 |
| 2007/0276595 A1 | 11/2007 | Lewinson et al. | |
| 2007/0290839 A1 | 12/2007 | Uyeki et al. | |
| 2007/0293958 A1 | 12/2007 | Stehle et al. | |
| 2007/0294023 A1* | 12/2007 | Arcot | G08G 1/0104 701/117 |
| 2007/0299599 A1 | 12/2007 | Letchner et al. | |
| 2007/0299601 A1 | 12/2007 | Zhao et al. | |
| 2008/0012726 A1 | 1/2008 | Publicover | |
| 2008/0014908 A1 | 1/2008 | Vasant | |
| 2008/0022329 A1 | 1/2008 | Glad | |
| 2008/0033636 A1 | 2/2008 | Ryu et al. | |
| 2008/0040031 A1 | 2/2008 | Tu | |
| 2008/0046173 A1* | 2/2008 | Lappe | G01C 21/3438 701/533 |
| 2008/0046175 A1 | 2/2008 | Tengler et al. | |
| 2008/0052545 A1 | 2/2008 | Finkelstein et al. | |
| 2008/0071465 A1 | 3/2008 | Chapman et al. | |
| 2008/0077309 A1 | 3/2008 | Cobbold | |
| 2008/0088479 A1 | 4/2008 | Caminiti et al. | |
| 2008/0091342 A1 | 4/2008 | Assael | |
| 2008/0140305 A1 | 6/2008 | Kim et al. | |
| 2008/0148176 A1 | 6/2008 | Mita | |
| 2008/0155030 A1* | 6/2008 | Fortier | H04L 51/04 709/206 |
| 2008/0195428 A1 | 8/2008 | O'Sullivan | |
| 2008/0248815 A1 | 10/2008 | Busch | |
| 2008/0262716 A1* | 10/2008 | Li | G08G 1/096838 701/533 |
| 2008/0271072 A1 | 10/2008 | Rothschild et al. | |
| 2008/0293407 A1 | 11/2008 | Cormier et al. | |
| 2009/0005964 A1* | 1/2009 | Forstall | G08G 1/096883 701/533 |
| 2009/0017803 A1* | 1/2009 | Brillhart | G01C 21/20 455/457 |
| 2009/0037097 A1 | 2/2009 | Cho et al. | |
| 2009/0044235 A1 | 2/2009 | Davidson | |
| 2009/0070031 A1 | 3/2009 | Ginsberg | |
| 2009/0118995 A1 | 5/2009 | Zhao et al. | |
| 2009/0164110 A1 | 6/2009 | Basir | |
| 2009/0197617 A1* | 8/2009 | Jayanthi | H04W 12/06 455/457 |
| 2009/0221302 A1 | 9/2009 | Luiro et al. | |
| 2009/0234573 A1 | 9/2009 | Notarantonio | |
| 2009/0240424 A1 | 9/2009 | Hayes-Roth | |
| 2009/0248587 A1 | 10/2009 | Van Buskirk | |
| 2009/0271101 A1* | 10/2009 | Relyea | G08G 1/012 701/119 |
| 2009/0276154 A1* | 11/2009 | Subramanian | G01C 21/20 701/469 |
| 2009/0276174 A1* | 11/2009 | Good | G05B 19/41875 702/81 |
| 2010/0037248 A1 | 2/2010 | Lo et al. | |
| 2010/0042318 A1 | 2/2010 | Kaplan et al. | |
| 2010/0057336 A1 | 3/2010 | Levine et al. | |
| 2010/0094544 A1* | 4/2010 | Hess | G01C 21/367 701/532 |
| 2010/0214126 A1 | 8/2010 | Publicover | |
| 2010/0231383 A1 | 9/2010 | Levine et al. | |

OTHER PUBLICATIONS

Office Action mailed Jan. 23, 2013, U.S. Appl. No. 12/588,786, filed Oct. 28, 2009, Israel Disatnik et al.
International Search Report for PCT Application No. PCT/IB2009/051857 dated Oct. 28, 2009.
International Search Report for PCT Application No. PCT/I82009/053179 dated Dec. 8, 2009.
International Search Report for PCT Application No. PCT/IB2009/053129 dated Feb. 3, 2010.
Kanoh, H., "Dynamic Route Planning for Car Navigation Systems Using Virus Generic Algorithms," International Journal of Knowledge-Based Intelligent Engineering Systems, pp. 65-78, Jan. 2007.
International Search Report for PCT Application No. PCT/IB2010/050726 dated Jun. 29, 2010.
International Search Report for PCT Application No. PCT/IB2010/051752 dated Sep. 8, 2010.
International Search Report for PCT Application No. PCT/IB2010/054527 dated Jun. 28, 2011.
International Search Report for PCT/IB2009/051857 dated Oct. 28, 2009.
Terdiman, Waze iPhone app provides real-time, crowdsourced traffic data, CNET News, Aug. 6, 2009, 5 pages.

* cited by examiner

SYSTEM AND METHOD FOR REALTIME COMMUNITY INFORMATION EXCHANGE

CROSS-REFERENCE TO RELATED APPLICATIONS

The present application is a continuation of U.S. patent application Ser. No. 14/995,660, filed on Jan. 14, 2016, which is a continuation of U.S. patent application Ser. No. 14/279,766, filed on May 16, 2014, which issued as U.S. Pat. No. 9,275,544, which is also a continuation of U.S. patent application Ser. No. 12/122,810, filed on May 19, 2008, which issued as U.S. Pat. No. 8,762,035, the disclosures of which are incorporated herein by reference.

BACKGROUND OF THE INVENTION

There are known services for traffic reporting, for example, radio traffic reporting and websites which provide such services.

Additionally, there are services which calculate estimated preferred routes, for example, based on pre-calculated stored data, such as, for example, data on traffic lights, average velocities, roads conditions and other suitable data. The calculation of the estimated preferred route by these services usually does not take into account the actual current traffic conditions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
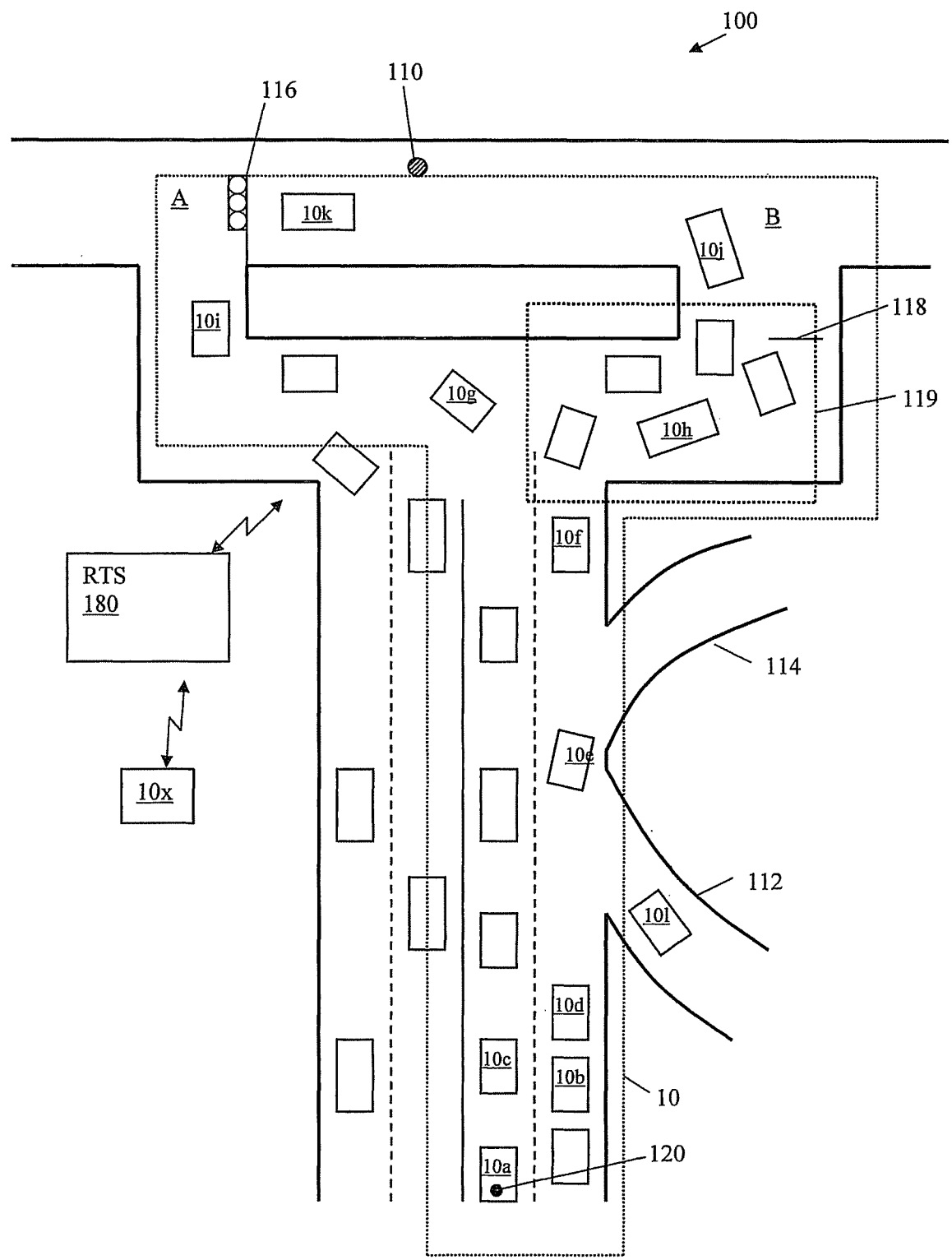
FIG. 1 is a schematic illustration of roads system and members of service for mapping traffic according to one embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention may provide a service which may constantly provide a real time updated traffic reports and may calculate preferred routes based on real time data on the traffic conditions.

Embodiments of the present invention may enable traffic mapping and/or reporting, wherein members of the service may transmit their location and other data to a central server. Other data may comprise one or more of type of mobility (e.g. car, motorcycle, bicycle and the like), destinations/origins (e.g., home address, work address and the like), alerts, traffic information, messages and/or any other suitable data. The central server may map all the members and thus, for example, create a traffic map.

The members of the service may be grouped in groups of members, for example, group of members which advance in a same or similar route and/or with the same or similar location and/or destination. A user of the system and method according to embodiments of the invention may be ascribed to a group, for example, of members advancing in the same or similar route and at least the most of them are ahead of him. The user may receive updates from the system on the members of the group, for example, location and/or speed of members of the group and/or other information based on inputs received from the members of the group. The user may further receive updated relevant traffic information, inferred by the system based on actual information received from other members in the same group.

Reference is now made to FIG. 1, which is a schematic illustration of roads system 100 and members 10a-10l and 10x of a service for mapping traffic according to one embodiment of the present invention. Roads system 100 is an exemplary road system and the present invention is not limited to road system 100, its configuration as may be reflected in FIG. 1 or to any other road system. Each of members 10a-10k may transmit his/her location to a Real Time Server (RTS) 180. For example, each of members 10a-10k may have a navigation device (shown, for example, in FIG. 2) which may be in communication with RTS 180. RTS 180 may receive from the navigation device the location of the member, for example, periodically. For example, member 10a may be located at location 120 at a specific time and may transmit his/her location to RTS 180. RTS 180 may record the location received from, for example, member 10a, along with a time stamp indicating the time at which the location of member 10a was recorded.

Member 10a may also send its destination to RTS 180, for example, destination 110. Alternatively, RTS 180 may estimate a destination 110 of member 10a, taking into account, for example, the general direction, current road, historical tracks of member 10a and/or popular destinations and/or based on other suitable parameters. RTS 180 may automatically define a group of members 10 (confined with square dotted line), for example, which their momentary location may be relevant to on-going calculation of a route for member 10a from location 120 to destination 110. For example, each of the members in members group 10 may advance in one of several possible routes towards destination 110 and may be located between location 120 of member 10a and destination 110, for example, members 10b-10k. Member 10a may be defined as a user member 10a of group 10, which may be grouped according to requirements of member 10a. Additionally, members of group 10 may be selected by RTS 180 according to, for example, the type of mobility of the member, for example, if the member travels by car, motorcycle, bicycle, by foot, or any other type of transportation. The members of group 10 may be selected, for example, to have similar type of transportation/mobility. Additionally, the members of group 10 may be selected, for example, according to their direction, e.g., in case a member of the service is located in a route between location 120 of user member 10*a* and destination 110, but advances in the opposite direction, e.g., from destination 110 to location 120, this member may not be included in group 10. Additionally or alternatively, the membership in a group may be limited to members in a certain distance from the momentary location of the user member 10*a*. In some embodiments, user member 10*a* may instruct RTS 180 according to which parameters the members of group 10 may be selected, for example, the parameters mentioned above and/or other parameters, such as, for example, the kind of road preferred by user member 10*a*, e.g., a broad road, a narrow road, a main road, a highway, a sideway, or any other kind of road. Additionally or alternatively, member 10*a* may specify a road, for example, a specific road number, which should be excluded from or included in the route.

Group of members 10 may change with time according to changes in situations of the members, changes in the traffic in which members take part, etc. A member may be added to a group, for example group 10, if his/her respective parameters meet the definitions of the group. A member may be removed from a group, for example group 10, if his/her respective parameters no longer meet the definitions of the group. For example, members may be added to the group 10 if, for example, an additional member enters a route between the location 120 of member 10*a* and destination 110 and/or if a member, which was disconnected from RTS 180 for some reason, re-connects to RTS 180 at a certain later moment. For example, member 10*l* may enter a route between location 120 and destination 110 from road 112 and then, for example, it may be added to group 10. Members may be subtracted from the group 10 if, for example, a member is no longer located in a route between the location 120 of member 10*a* and destination 110, for example, the member departs from the route, or, for example, if a member disconnects from RTS 180 at a certain time. For example, member 10*e* may deviate to road 114 and then, for example, may not be located in a route between location 120 and destination 110 and thus, for example, may be subtracted from group 10. In other case member 10*a* may by-pass one of the members of group 10 and thus, for example, the by-passed member will no longer be located in a route to destination 110 between user member 10*a* and destination 110 and therefore it may be subtracted from group 10.

RTS 180 may receive the locations of the members of group 10, for example, periodically. RTS 180 may create a dynamic traffic map showing the locations of the members of group 10 based on the received locations and the changes in group 10. RTS 180 may also calculate the velocities of the members, for example, based on the changes in the locations between one update to the next one, for example, in case the locations updates are received periodically. Member 10*a* may receive from RTS 180 the traffic map, which may be displayed, for example, on a pre-loaded map on a display of, for example, the personal navigation device (shown in FIG. 2). The traffic map may dynamically change and show the location and movement of the members of group 10 and/or the changes in group 10. Each of the members of the service may request from RTS 180 that their location will not be shown to other members.

RTS 180 may receive from the members of the service other traffic data in addition to location data, such as, for example, alerts and/or notifications on traffic jams, long periods of red traffic lights, accidents, blocked lanes, or any other information that may be of assistance for a traveler of that route, for example user member 10*a*. RTS 180 may prepare a graphical representation of traffic data which forms a dynamic traffic map that may be displayed to member 10*a* with or without geographical map, street map, road map, etc. Based on the dynamic map Member 10*a* may decide on a preferred route to reach destination 110. Additionally or alternatively, according to some embodiments of the present invention, RTS 180 may calculate based on the continuously updating location data and optionally on the other traffic data received and/or calculated, a preferred route to reach destination 110, for example, according to one or more characteristic priorities and may notify member 10*a* on this route. Member 10*a* may request to receive the preferred route from RTS 180. Member 10*a* may define for RTS 180 the characteristics of the preferred route, for example, the shortest route, the fastest route, route that passes or not passes in certain roads and/or areas, and/or other preferences of member 10*a*.

RTS 180 may re-calculate the preferred route, for example, periodically and/or upon request of user member 10*a* and/or upon change in the circumstances, for example, changes in traffic conditions, the disclosure of a new road accident which was not included in precious considerations, defective traffic lights, or any other change in the conditions that may have an impact on the decisions of member 10*a* regarding selecting a route to go to, for example, destination 110. RTS 180 may notify user member 10*a* on the updated preferred route for example, if the update in the preferred route is relevant to member 10*a*, for example, periodically and/or upon change in the preferred route. RTS 180 may take into account the current location of member 10*a* in order to decide whether the updated preferred route is relevant to member 10*a*.

In the example of FIG. 1, member 10*a* may reach destination 110 through junction A or through junction B. Junction A may be a junction with traffic light 116. RTS 180 may be notified on traffic light 116 by one or more of the members of group 10, for example, by members 10*k* and/or 10*i*. Additionally or alternatively, data on traffic lights and/or traffic signs may be stored in RTS 180 and may be integrated by RTS 180 into the traffic map. RTS 180 may receive notifications and/or alerts on other traffic event. For example, RTS 180 may receive a notification if traffic light 116 is out of order. In other example, RTS 180 may receive a notice on a blocked lane at location 118, for example, near junction B. RTS 180 may integrate the received information into the traffic map and/or calculate based on the received information a preferred route to reach destination 110. For example, the blocked lane extending from location 118 and backwards (with respect to the traffic direction) may cause a traffic jam zone 119. RTS 180 may identify traffic jam zone 119 based, for example, on the average velocity of the members located in jam zone 119 or in areas preceding jam zone 119.

Additionally, RTS 180 may enable exchange of messages between members of the service. A message sent by a member may be transmitted, at the choice of said members and/or of RTS 180, to all the members of the service or to one or more groups of members which may be selected, for example, by the sending member and/or by RTS 180, for example, according to the relevance of the information to the members. Alternatively, a member may specify the members of the service to which the message should be sent, namely to each one or by groups or by any other relevant method of definition. The messages may include, for example, traffic information and/or alerts, such as, for example, police speed traps, accidents, special events along the route, and/or any other kind of messages. The Messages may be displayed on the display of the personal navigation device (shown in FIG. 2) or may be presented to the user on any other display or vocally, or any other means of system-user interface.

Additionally, member, such as for example member 10x, may request from RTS 180 advise or data of a preferred route from a certain starting point to a certain destination, and RTS 180 may calculate a preferred route, for example, based on information received from members of the service in relevant locations as well as based on personal preferences of member 10x. Member 10x may request to receive from RTS 180 a preferred route, for example, from location 120 to destination 110. RTS 180 may calculate the preferred route based on, for example, information received from the members of group 10 as described in detail above.

Each of the members of the service, for example, each of members 10a-10l, may be a user member, for which RTS 180 may create a group of members as described in detail above, for example, according to a beginning point, for example, a current location of the user member or other beginning point defined by the user member, and a required destination point, for example, defined by the user member. Additionally or alternatively, each of the users may define a group of his own according to, for example, parameters mentioned above and/or other suitable parameters.

Additionally, a member of the service may choose specific members to construct a group, from which he may receive information regarding their location and/or other traffic information and/or other messages, for example, a group of family members and/or friends and/or a work team or any other chosen group of members.

Figure 2:
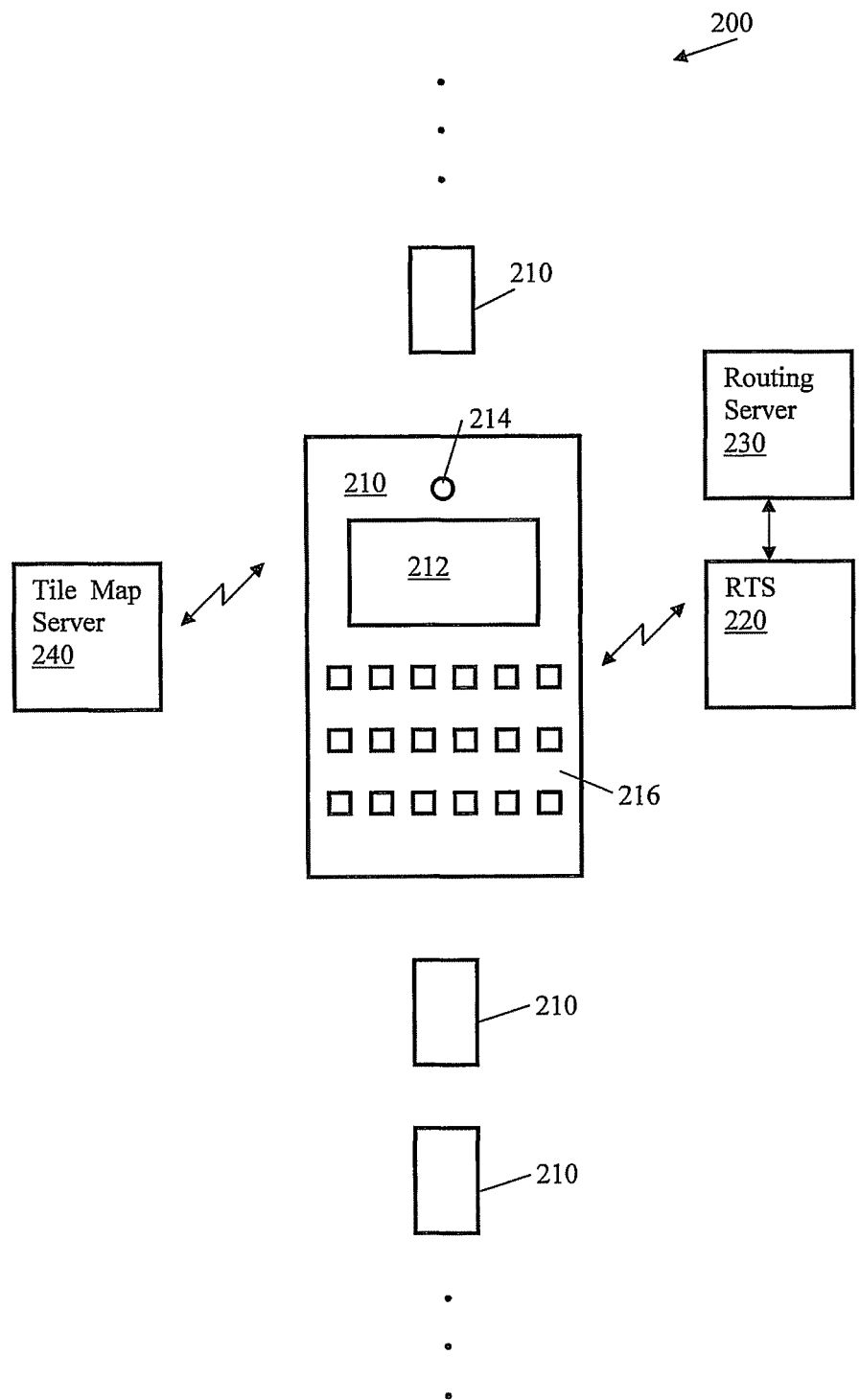
FIG. 2 is a schematic illustration of an exemplary system for providing mapping traffic service according to embodiments of the present invention.

Reference is now made to FIG. 2, which is a schematic illustration of an exemplary system 200 for providing mapping traffic service according to embodiments of the present invention. System 200 may include a plurality of personal navigation devices 210, each of the navigation devices may belong to a member of the mapping traffic service. Personal navigation devices 210 may include, for example, GPS navigation device, mobile phones, Personal Digital Assistants (PDA), Personal Navigation Devices (PND), car PC, mobile computers, or any other suitable device able to include, receive and manipulate and/or operate navigation software. The plurality of personal navigation devices 210 with connectivity capability may be in communication with real time server (RTS) 220, for example, by a cellular network or wireless network or any other mobile communication means. The connection between navigation devices 210 and RTS 220 may be made by any known connection protocol, for example, Transmission Control Protocol (TCP), User Datagram Protocol (UDP), Hypertext Transfer Protocol (HTTP), Wireless Application Protocol (WAP) or any other suitable protocol. Members of the service may send to RTS 220, for example, by personal navigation devices 210, their momentary location and/or speed details for example, periodically for example, as described in detail above with reference to FIG. 1. Additionally, the members may send to RTS 220, for example, by personal navigation devices 210, information on different events, for example, traffic information and/or alerts and/or messages to other members, for example, as described in detail above.

In some embodiments of the present invention, personal navigation device 210 may avoid sending redundant information to RTS 220. Personal navigation device 210 may receive and store parameters such as an average speed in a road, known traffic signs, traffic lights and/or other information. Personal navigation device 210 may avoid from sending information that is already known and/or data which may not add to the known information. This may allow an efficient information communication.

Personal navigation device 210 may automatically send momentary location and/or speed data of the member to RTS 220, for example, periodically, for example by a software included in navigation device 210. The software may be provided and/or installed on navigation device 210, for example, upon registration of the user of navigation device 210 as a member of the traffic mapping service. Other information that may be sent to RTS 220 by navigation device 210 may be entered by the member manually, for example, by keyboard 216 which may be included in navigation device 210 or by calling a service center or by any other suitable kind of communication.

Members of the traffic mapping service may receive, for example, displayable notices on a display 212 and/or vocal notices by a speaker 214, each may be included on navigation device 210. A map may be displayed on display 212, on which locations of members may be displayed. The map may be downloaded and/or installed on navigation device 210. Alternatively, navigation device 210 may receive map data from a tile map server 240, for example, by streaming the map data through a network or in any other suitable manner. Each of the members may request that his location will not be displayed on the map on display 212 of other users. Other traffic information may be received from RTS 220 and displayed on the map, for example, traffic lights location and status, accidents, blocked lanes and other information which may, for example, be received from users of the service and/or may be calculated by the service based on information received from users of the service. As described in detail above, a member may request and receive from RTS 220 a preferred route to reach a desired destination. The preferred route may be displayed on display 212, with or without additional map-associated data such as geographical map, road map, streets map and the like. A member, additionally or alternatively, may receive from RTS 220 vocal navigation instructions by speaker 214. The preferred route may be updated by RTS 220, as described in detail above with reference to FIG. 1, and the updated route may be displayed on the map display 212. An updated traffic map and/or updated route may be calculated periodically and/or upon request of the member or upon a significant change in the road and/or traffic conditions.

Additionally, a member may receive from RTS 220 alerts, information and messages from other members, which may be displayed on display 212 and/or may be notified vocally by speaker 214.

A member of the service may define for RTS 220 the kinds of information and/or alerts he wishes to receive, and then, for example, RTS 220 may transmit to the navigation device of the member information according to the member's preferences.

RTS 220 may calculate for each user member the group of members which may provide information relevant to the user member, for example, according to parameters as described in detail above. The group may dynamically change and may be calculated, for example, periodically and/or upon change in the situation of the group members and/or upon change in the preferences of the user member.

A preferred route may be calculated by a routing server 230. Routing server 230 may receive from RTS 220 traffic information and updates in real time, which may be received by RTS 220 from the members of the service. Additionally, routing server 230 may optionally receive from RTS 220 definitions of preferred routes of user members. Based on the received information and the optional definitions of a preferred route, routing server 230 may calculate and/or send to RTS 220 the preferred route for each user member. Routing server 230 may re-calculate and/or send to RTS 220 updates of the preferred routes, for example, periodically or upon receiving a traffic information update or upon request from RTS 220. It shall be noted that according to embodiments of that two or more of tile map server 240, RTS 220 and routing server 230 may be embodied as units within one device. Additionally, each one of tile map server 240, RTS 220 and routing server 230 may be implemented in hardware, in software or in a combination of them.

Figure 3:
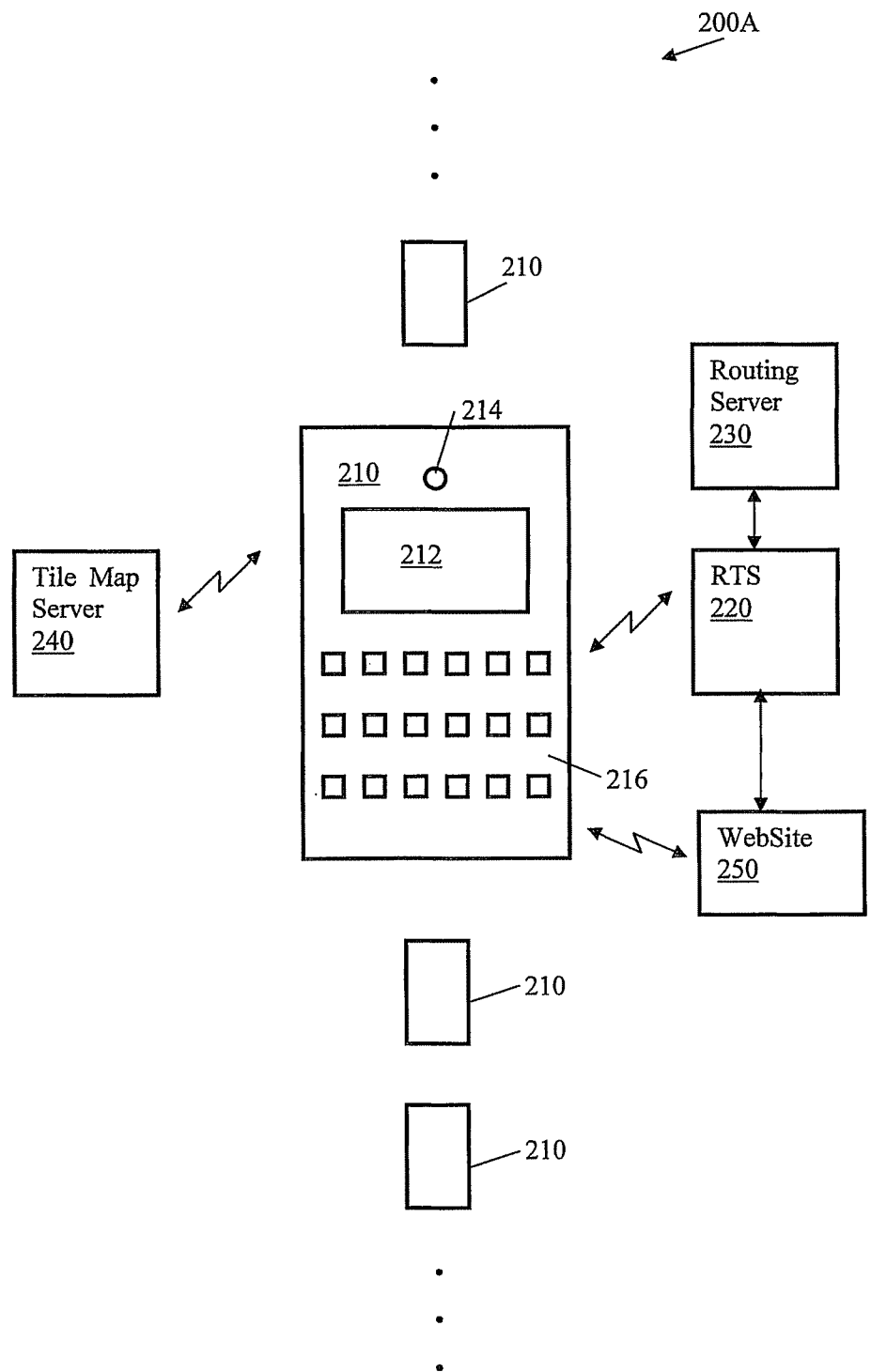
FIG. 3 is a schematic illustration of another exemplary system for providing mapping traffic service according to embodiments of the present invention.

Reference is now made to FIG. 3, which is a schematic illustration of another exemplary system 200A for providing mapping traffic service according to embodiments of the present invention. System 200A may include a plurality of personal navigation devices 210, real time server (RTS) 220, routing server 230 and tile map server 240, which may by similar to the same elements included in system 200 and/or function as described with reference to FIG. 2. Additionally, System 200A may include a website 250. Website 250 may be in communication with at least one of personal navigation devices 210 and/or with RTS 220. Information may be uploaded to website 250, for example, by members of the service, for example, through personal navigation devices 210 and/or manually. At least a portion of the uploaded information may be communicated to each of personal navigation device 210 which may be in communication with website 250. The information uploaded to website 250 may be, for example, location information, velocity information, traffic information and/or other information and/or messages and/or alerts uploaded by a user. Website 250 may indicate traffic information and/or other information, messages and/or alerts communicated to website 250 by, for example, RTS 220 and/or a member of the service.

Figure 4:
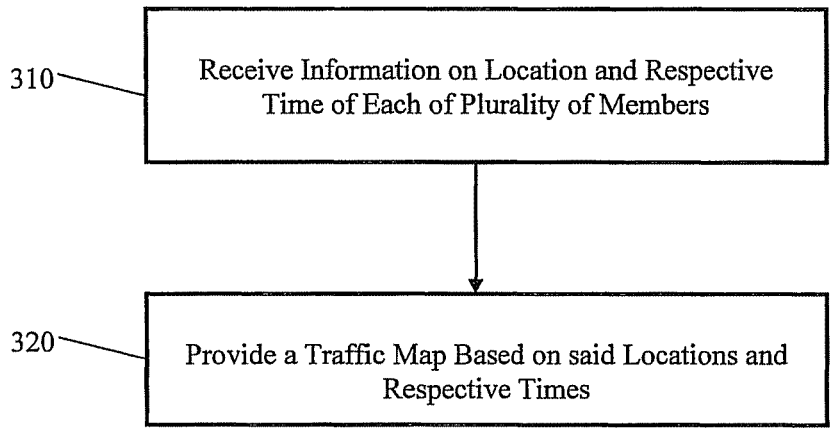
FIG. 4 is a flow chart illustrating a method for providing traffic mapping service according to embodiments of the present invention.

Reference is now made to FIG. 4, which is a flow chart illustrating a method for providing traffic mapping service according to embodiments of the present invention. As shown in block 310, the method may include, for example, receiving information on location and respective time of each of plurality of members. As shown in block 320 the method may include, for example, providing a traffic map based on said locations and said respective times, for example, as described in detail above with reference to FIGS. 1 and 2.

Figure 5:
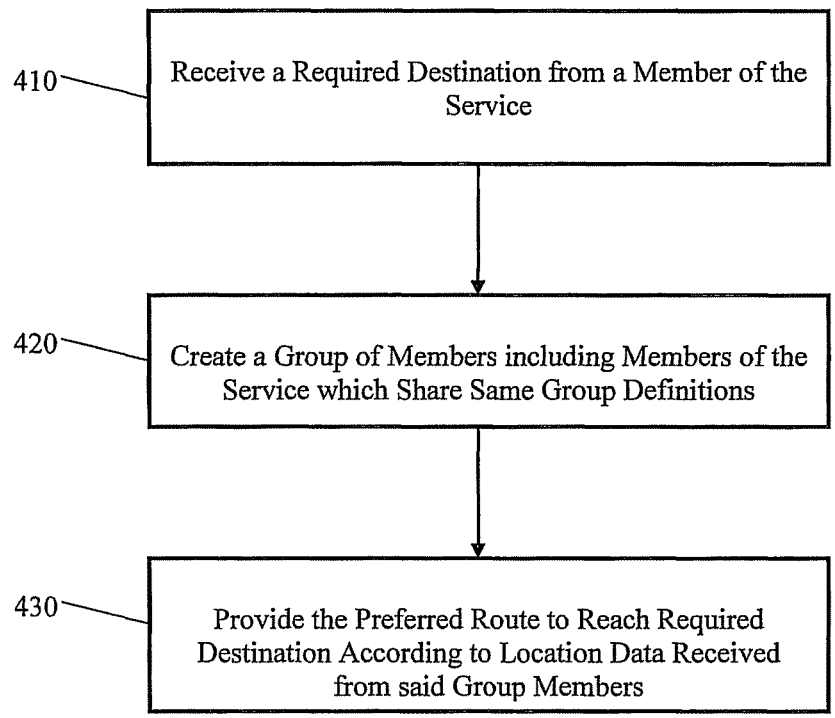
FIG. 5 is a flow chart illustrating a method for providing traffic mapping service according to embodiments of the present invention.

Reference is now made to FIG. 5, which is a flow chart illustrating a method for providing traffic mapping service according to embodiments of the present invention. As shown in block 410, the method may include, for example, receiving a required destination from a member of the service. As shown in block 420 the method may include, for example, creating a group of members including members of the service which share same group definitions, for example, advance in the direction of said destination, for example, as described in detail above with reference to FIGS. 1 and 2. As shown in block 430, the method may include, for example, providing the preferred route to reach the required destination according to location data and/or traffic information received from said group members and/or inferred based on information received from said group members, as described in detail above with reference to FIGS. 1 and 2.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A navigation system comprising:
a server configured to:
receive location information from a set of navigation devices, each navigation device of the set of navigation devices being associated with a member of a navigation service, wherein the location information comprises a current location of the respective navigation device;
identify a destination for a first navigation device of the set of navigation devices, wherein the destination comprises a geographical place to which the first navigation device is traveling;
receive, from the first navigation device, an indication of at least one parameter associated with the location information, the at least one parameter including a route preference;
select a subset of navigation devices from the set of navigation devices based on the destination of the first navigation device and the at least one parameter, the subset including a plurality of navigation devices and excluding navigation devices that do not meet the at least one parameter;
continuously update the location information from the navigation devices in the subset;
generate a dynamic representation of real-time traffic data based on at least the continuously updated location information received from the subset of navigation devices; and
send the dynamic representation to the first navigation device.

2. The system of claim 1, wherein the server is further configured to determine a route to the destination of the first navigation device using the location information received from the first navigation device, and wherein selecting the subset of navigation devices is further based on the route.

3. The system of claim 2, wherein the server is further configured to select the subset of navigation devices further based on the location information received from the subset of navigation devices.

4. The system of claim 2, wherein the server is further configured to select the subset of navigation devices further based on comparison between the location information received from the subset of navigation devices and the route.

5. The system of claim 1, wherein the server is further configured to select the subset of navigation devices further based on a type of mobility for any members associated with the subset of navigation devices.

6. The system of claim 1, wherein the server is further configured to select the subset of navigation devices further based on a type of mobility for the member associated with the first navigation device.

7. The system of claim 1, wherein the server is further configured to:
as the location information received from the set of navigation devices changes over time, update the subset of navigation devices by adding new navigation devices to the subset of navigation devices and/or removing navigation devices from the subset of navigation devices.

8. The system of claim 1, wherein the server is further configured to identify a destination for each navigation device of the set of navigation devices and wherein the subset of navigation devices is further selected based on the destinations of the set of navigation devices.

9. The system of claim 1, wherein the location information received from the set of navigation devices identifies a last current location reported to the server and the server is further configured to select the subset of navigation devices based on a distance between the last current locations reported of the set of navigation devices and the last current location reported of the first navigation device.

10. The system of claim 1, wherein the server is further configured to:
calculate a route to the destination based on the continuously updated location information; and
send the route to the first device.

11. A method comprising:
receiving, by a server, location information from a set of navigation devices each navigation device of the set of navigation devices being associated with a member of a navigation service, wherein the location information comprises a current location of the respective navigation device;
identifying, by the server, a destination for a first navigation device of the set of navigation devices, wherein the destination comprises a geographical place to which the first navigation device is traveling;
receiving, from the first navigation device, an indication of at least one parameter associated with the location information, the at least one parameter including a route preference;
selecting, by the server, a subset of navigation devices from the set of navigation devices based on the destination of the first navigation device and the at least one parameter, the subset including a plurality of navigation devices and excluding navigation devices that do not meet the at least one parameter;
continuously updating, by the server, the location information from the navigation devices in the subset;
generating, by the server, a dynamic representation of real-time traffic data based on at least the continuously updating location information received from the subset of navigation devices; and
sending, by the server, the dynamic representation to the first navigation device.

12. The method of claim 11, further comprising determining a route to the destination of the first navigation device using the location information received from the first navigation device, and wherein selecting the subset of navigation devices is further based on the route.

13. The method of claim 12, wherein selecting the subset of navigation devices is further based on the location information received from the subset of navigation devices.

14. The method of claim 12, wherein selecting the subset of navigation devices is further based on comparison between the location information received from the subset of navigation devices and the route.

15. The method of claim 11, wherein selecting the subset of navigation devices is further based on a type of mobility for any members associated with the subset of navigation devices.

16. The method of claim 11, wherein selecting the subset of navigation devices is further based on a type of mobility for the member associated with the first navigation device.

17. The method of claim 11, further comprising:
as the location information received from the set of navigation devices changes over time, updating the subset of navigation devices by adding and/or removing navigation devices from the subset of navigation devices.

18. The method of claim 11, further comprising:
calculating, by the server, a route to the destination based on the continuously updated location information; and
sending the route to the first device.

19. A non-transitory computer-readable medium storing instructions executable by one or more processors for performing a method, comprising:
receiving location information from a set of navigation devices, each navigation device of the set of navigation devices being associated with a member of a navigation service, wherein the location information comprises a current location of the respective navigation device;
identifying a destination for a first navigation device of the set of navigation devices, wherein the destination comprises a geographical place to which the first navigation device is traveling;
receiving, from the first navigation device, an indication of at least one parameter associated with the location information, the at least one parameter including a route preference;
selecting a subset of navigation devices from the set of navigation devices based on the destination of the first navigation device and the at least one parameter, the subset including a plurality of navigation devices and excluding navigation devices that do not meet the at least one parameter;
continuously updating the location information from the navigation devices in the subset;
generating a dynamic representation of real-time traffic data based on at least the continuously updated location information received from the subset of navigation devices; and
sending the dynamic representation to the first navigation device.

* * * * *